(12) United States Patent
Saito

(10) Patent No.: US 9,879,755 B2
(45) Date of Patent: Jan. 30, 2018

(54) CHAIN

(71) Applicant: Senqcia Corporation, Tokyo (JP)

(72) Inventor: Ryoichi Saito, Kumagaya (JP)

(73) Assignee: SENQCIA CORPORATION, Tokyo (JP)

( * ) Notice: Subject to any disclaimer, the term of this patent is extended or adjusted under 35 U.S.C. 154(b) by 135 days.

(21) Appl. No.: 14/877,297

(22) Filed: Oct. 7, 2015

(65) Prior Publication Data

US 2017/0102050 A1    Apr. 13, 2017

(51) Int. Cl.
*F16G 13/02*    (2006.01)
*F16H 55/46*    (2006.01)
*F16G 13/06*    (2006.01)

(52) U.S. Cl.
CPC .................................. *F16G 13/06* (2013.01)

(58) Field of Classification Search
CPC .......... F16G 13/06; F16H 55/30; F16H 55/12; B65G 39/20; Y10T 74/1994
USPC .................................................. 474/226, 95
See application file for complete search history.

(56) References Cited

U.S. PATENT DOCUMENTS

| | | | | | |
|---|---|---|---|---|---|
| 438,822 | A | * | 10/1890 | Philion | F16H 55/30 403/381 |
| 569,663 | A | * | 10/1896 | Perkins | F16H 55/30 403/344 |
| 726,669 | A | * | 4/1903 | Furbish | F16G 13/06 474/206 |
| 963,941 | A | * | 7/1910 | Reinhart et al. | F16G 13/06 474/226 |
| 1,758,280 | A | * | 5/1930 | Evans | B65G 13/00 193/37 |
| 1,829,973 | A | * | 11/1931 | Wilkinson | B65G 39/20 193/37 |
| 2,450,565 | A | * | 10/1948 | Saifyrd | F16G 13/06 474/226 |
| 3,159,047 | A | * | 12/1964 | Dable | F16H 55/12 403/344 |
| 3,421,313 | A | * | 1/1969 | Kai | F16G 13/06 474/226 |
| 4,265,134 | A | * | 5/1981 | Dupoyet | F16G 13/06 474/231 |
| 4,402,390 | A | * | 9/1983 | Feeney | B65G 39/02 193/37 |
| 4,506,559 | A | * | 3/1985 | Francke | F16H 55/12 29/892.1 |
| 4,553,791 | A | * | 11/1985 | Blair | B62D 55/205 305/186 |
| 4,573,563 | A | * | 3/1986 | Delhaes | B65G 39/06 193/37 |

(Continued)

FOREIGN PATENT DOCUMENTS

JP    2007-176615 A    7/2007

*Primary Examiner* — Henry Liu
(74) *Attorney, Agent, or Firm* — Oliff PLC

(57) ABSTRACT

A chain made up of bush link plates, bushes fitted into bush fitting holes, and rollers fitted rotatably on an outer circumference of each of the bush. In order to make it possible to replace the roller without removing the bush from the bush link plates, in the chain made up of the bush link plates provided with bush fitting holes, the bushes fitted into the bush fitting holes, and the rollers fitted rotatably on the outer circumference of each of the bushes, the roller is formed from split rollers made by splitting the roller into two or more parts.

2 Claims, 8 Drawing Sheets

(56) References Cited

U.S. PATENT DOCUMENTS

| | | | | |
|---|---|---|---|---|
| 4,596,539 A * | 6/1986 | Yamasaki | ................ | B62M 9/10 474/206 |
| 4,631,974 A * | 12/1986 | Wiegand | ................ | F16H 55/06 474/152 |
| 4,704,098 A * | 11/1987 | Tsubakimoto | .......... | F16G 13/02 474/206 |
| 4,722,240 A * | 2/1988 | Frederick | ............ | F16H 57/0031 384/420 |
| 5,057,058 A * | 10/1991 | Crudup | ................... | F16H 55/46 474/95 |
| 5,061,225 A * | 10/1991 | Drabel | ................... | B65G 23/06 474/95 |
| 5,117,970 A * | 6/1992 | Gibbs | ................... | B65G 39/07 198/808 |
| 5,267,909 A * | 12/1993 | Iacchetta | ................ | F16G 13/04 474/206 |
| 5,322,478 A * | 6/1994 | Bos | ........................ | B65G 23/06 474/95 |
| 5,378,203 A * | 1/1995 | Baebel | ................... | B65G 39/12 198/835 |
| 5,810,686 A * | 9/1998 | de Jong | ................... | F16H 55/30 474/161 |
| 5,938,554 A * | 8/1999 | Moster | .................... | F16G 13/06 474/206 |
| 6,086,495 A * | 7/2000 | Stebnicki | ................ | F16H 55/12 474/152 |
| 6,527,106 B2 * | 3/2003 | Tanabe | ................... | B65G 17/086 198/845 |
| 8,327,614 B1 * | 12/2012 | Tegeler | .................... | B01D 3/40 193/37 |
| 8,474,602 B2 * | 7/2013 | Miller | .................... | B65G 17/24 193/37 |
| 8,646,595 B2 * | 2/2014 | Miller | .................... | B65G 17/24 193/37 |
| 9,045,287 B2 * | 6/2015 | Miller | .................... | B65G 17/24 |
| 2001/0030112 A1* | 10/2001 | Tanabe | ................ | B65G 17/086 198/853 |
| 2007/0161443 A1* | 7/2007 | Krisl | ...................... | B65G 23/06 474/95 |

* cited by examiner

CHAIN

FIELD OF THE INVENTION

The present invention relates to a chain provided with rollers on an outer circumference of each of bushes.

BACKGROUND OF THE INVENTION

FIG. 8 shows one type of a chain structure.

A chain 160 is provided with platy pin link plates (outer link plates) 162 opposed to each other, and a pin insertion hole is made in each of both ends of the pin link plate (the outer link plate) 162.

Further, the chain 160 is provided with platy bush link plates (inner link plates) 164 opposed to each other, and a bush fitting hole is made in each of both ends of the bush link plate (the inner link plate) 164.

Each of fitting portions on both ends of a cylindrical bush 166 is fitted into the bush fitting hole, and a cylindrical roller 168 is fitted rotatably on an outer circumference of the bush 166.

Both the ends of the bush 166 are each provided with the fitting portion fitted into each of the bush fitting holes of the bush link plates (the inner link plates) 164, and a central portion of the bush 166 is provided with a pin through hole penetrated by a pin 170.

Further, the chain 160 is provided with rod-like pins 170. A cylindrical main body of the pin 170 is allowed to penetrate the pin through hole of the bush 166, and each end of the pin 170 is locked to the pin link plate (the outer link plate) 162.

The chain 160 is thus assembled and thereby is structured by flexibly linking these parts.

PRIOR ART DOCUMENTS

Patent Documents

[Patent Document 1] Japanese Unexamined Patent Application Publication No. 2007-176615

SUMMARY OF THE INVENTION

Problems to be Solved by the Invention

When driving a chain provided with rollers over the long term, the rollers are abraded and then it becomes necessary to replace only the rollers in some cases. On this occasion, conventionally the roller fitted rotatably on an outer circumference of a bush is a one-body cylindrical part, and hence in order to replace the roller, it is necessary to remove the bush from bush link plates and then remove the original roller abraded and finally fit a new roller on the chain.

It is an object of the present invention to make it possible to replace the roller without removing the bush from the bush link plates.

Means for Solving Problems

The present invention is intended to solve the above problem. Therefore, there is provided a chain made up of bush link plates provided with bush fitting holes, a bush fitted into the bush fitting holes, and a roller fitted rotatably on an outer circumference of the bush. In this chain, the roller is formed from split rollers made by splitting the roller into two or more parts.

Further, in the present invention, at least one of end faces of the above split roller is provided with a groove, and by engaging a stop ring with the above groove, the split rollers are joined together.

Furthermore, a protrusion and a depression, which are allowed to engage with each other when combining the above split rollers with each other, are provided on each of combining surfaces of the above split rollers.

Effects of the Invention

According to the present invention like this, in the chain made up of each of the bush link plates provided with the bush fitting holes, each of the bushes fitted into the bush fitting holes, and each of the rollers fitted rotatably on the outer circumference of each of the bushes; the roller is formed from the split rollers made by splitting the roller into two or more parts, and thereby it becomes possible to replace the roller without removing the bush from the bush link plates.

BRIEF DESCRIPTION OF THE DRAWINGS

FIG. 1(*b*) is a side view of a chain according to a first embodiment of the present invention.

FIG. 2(*b*) is a side view showing a split roller making up a roller of the chain according to the first embodiment of the present invention.

FIG. 3(*b*) is a side view showing a stop ring making up the roller of the chain according to the first embodiment of the present invention.

FIG. 4(*b*) is a side view showing a split roller making up a roller of a chain according to a second embodiment of the present invention.

FIG. 5(*b*) is a side view showing a split roller making up a roller of a chain according to a third embodiment of the present invention.

FIG. 6(*b*) is a side view showing a split roller making up a roller of a chain according to a fourth embodiment of the present invention.

FIG. 7(*b*) is a side view of a chain according to a fifth embodiment of the present invention.

DETAILED DESCRIPTION OF THE PREFERRED EMBODIMENTS

Hereunder is a specific description on embodiments of the present invention based on drawings. The descriptions on parts the same as in a conventional example are omitted.

Figure 1A:
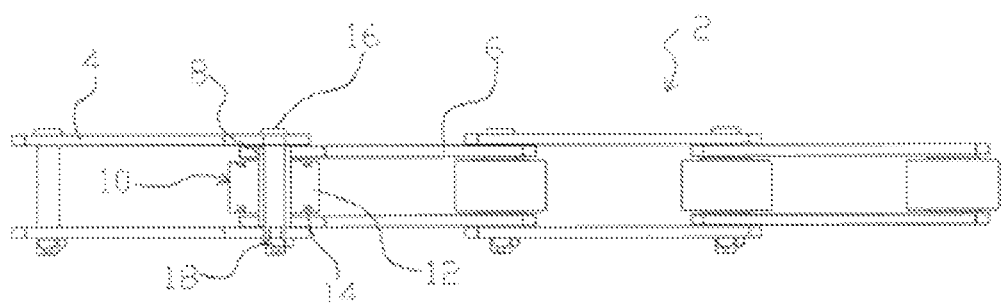
FIG. 1(*a*) is a plain view of a chain according to a first embodiment of the present invention.
Figure 1B:
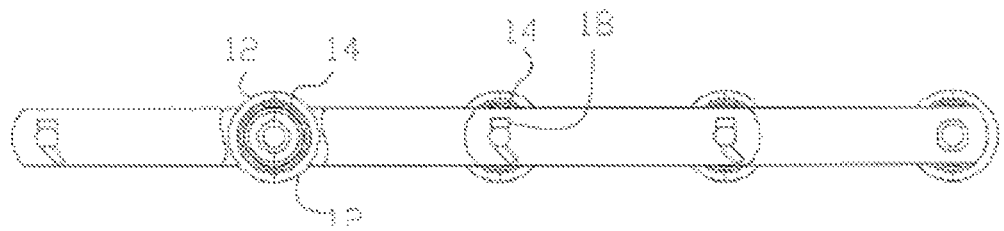
Figure 2A:
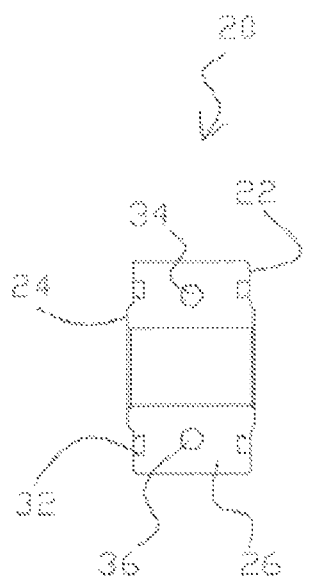
FIG. 2(*a*) is a front view showing a split roller making up a roller of the chain according to the first embodiment of the present invention.
Figure 2B:
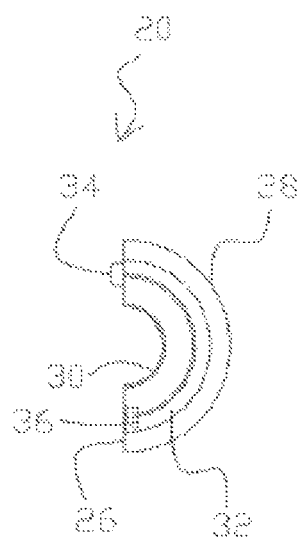
Figure 3A:
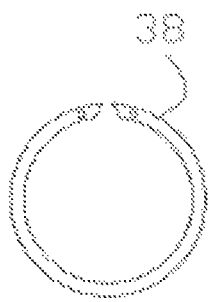
FIG. 3(*a*) is a front view showing a stop ring making up the roller of the chain according to the first embodiment of the present invention.

FIG. 1(a) is a plain view and FIG. 1(b) is a side view of a chain 2 according to a first embodiment of the present invention. FIG. 2(a) and FIG. 2(b) are views showing a split roller 20 (12) making up a roller 10 of a chain 2 according to the first embodiment of the present invention: FIG. 2(a) is a front view and FIG. 2(b) is a side view. FIG. 3(a) is a front view and FIG. 3(b) is a side view showing a stop ring 38.

Figure 3B:
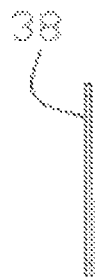

The roller 10 of the chain 2 according to the first embodiment of the present invention is formed by joining a couple of the split rollers 20 (12) shown in FIG. 2(a) and FIG. 2(b) by means of the stop ring 38 shown in FIG. 3(a) and FIG. 3(b). Drawings of stop rings for both axis and hole in second to fifth embodiments are omitted.

As shown in FIG. 2(a) and FIG. 2(b), the split roller 20 is approximately semicylindrical and is formed, in each of both end faces 22, 24, with a groove 32 for engaging with the stop ring 38 for axis. In order to engage with the stop ring 38 for axis, the groove 32 is formed so that a deeper portion than the end faces 22, 24 thrusts into a portion in the radial direction (so as to thrust into a portion in the inner circumferential surface 30 direction) of the roller.

The stop ring 38 for axis elastically deforms in such a direction as to expand its own diameter, and therefore with combining surfaces 26 combined with each other in the couple of the split rollers 20, the stop ring 38 for axis is allowed to elastically deform in such a direction as to expand its own diameter to work into a deeper portion of the groove 32 and engage with the groove 32, thereby enabling the couple of the split rollers 20 to be joined together and then integrated.

The combining surface 26 of each split roller 20 is provided with a protrusion 34 and a depression 36. When combining a couple of the combining surfaces 26 with each other in joining the couple of the split rollers 20, since the protrusion 34 and the depression 36 are allowed to engage with each other, the couple of the split rollers 20 are joined together without being displaced from each other, thereby permitting the cylindrical roller 10 to be formed.

In this manner, in the chain 2 according to the first embodiment of the present invention, by engaging the stop ring 38 for axis with the groove 32 formed in each split roller 20 with the couple of the split rollers combined with each other, the couple of the split rollers 20 are joined together to permit the roller 10 to be formed.

By making up the roller of the chain as just described, when the roller has been abraded due to the repeated use over the years, and hence it has become necessary to replace the roller of the chain, it becomes possible to remove the roller readily from the chain and then fit a new roller thereon.

Figure 4A:
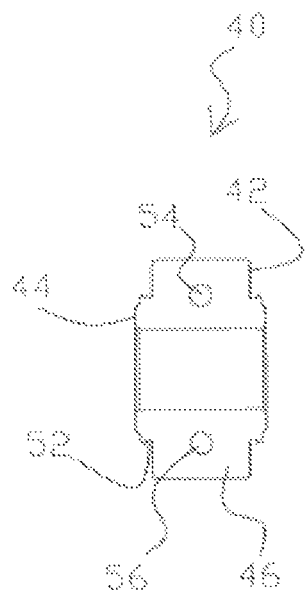
FIG. 4(*a*) is a front view showing a split roller making up a roller of a chain according to a second embodiment of the present invention.
Figure 4B:
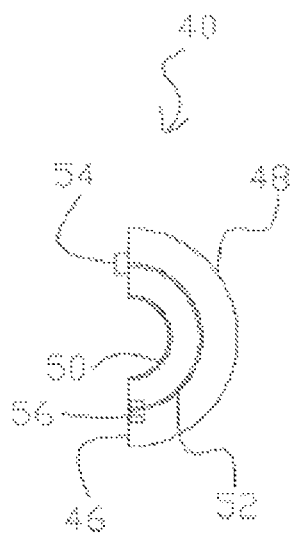

FIG. 4(a) and FIG. 4(b) are views showing a split roller 40 making up a roller of a chain according to the second embodiment of the present invention: FIG. 4(a) is a front view and FIG. 4(b) is a side view.

As shown in FIG. 4(a) and FIG. 4(b), the split roller 40 is approximately semicylindrical and is formed, in each of both end faces 42, 44, with a groove 52 for engaging with a stop ring for axis. Besides, each lateral face in the split roller 40 is provided with a protrusion 54 and a depression 56.

Also in the split roller 40 making up the roller of the chain according to the second embodiment, by engaging the stop ring for axis with the groove 52 formed in the split roller 40 and joining the couple of the split rollers 40 together to form the roller, when the roller of the chain has been abraded due to the repeated use over the years and hence has become necessary to be replaced, it becomes possible to remove the roller readily from the chain and then fit a new roller thereon.

Figure 5A:
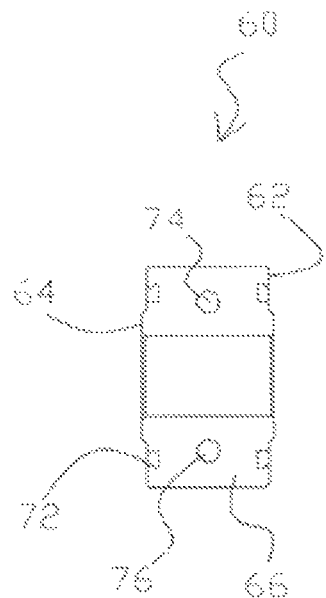
FIG. 5(*a*) is a front view showing a split roller making up a roller of a chain according to a third embodiment of the present invention.
Figure 5B:
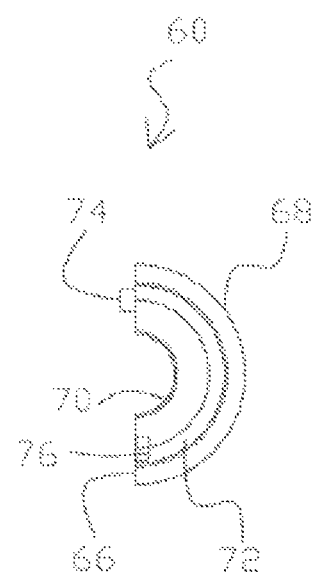

FIG. 5(a) and FIG. 5(b) are views showing a split roller 60 making up a roller of a chain according to the third embodiment of the present invention: FIG. 5(a) is a front view and FIG. 5(b) is a side view.

As shown in FIG. 5(a) and FIG. 5(b), the split roller 60 is approximately semicylindrical and is formed, in each of both end faces 62, 64, with a groove 72 for engaging with a stop ring for hole. In order to engage with the stop ring for hole, the groove 72 is formed in such a manner that a deeper portion than the end faces 62, 64 expands in the outer circumferential surface 68 direction.

The stop ring for hole elastically deforms in such a direction as to reduce its own diameter, and therefore with a couple of the split rollers 60 combined with each other, the stop ring for hole is allowed to deform elastically in such a direction as to reduce its own diameter. Accordingly, the stop ring for hole is allowed to work into the deeper portion of the groove 72 and engage with the groove 72, thereby making it possible to join and integrate the couple of the split rollers 60 together.

Further, each combining surface of the split roller 60 is provided with a protrusion 74 and a depression 76. When combining the combining surfaces 60 with each other in joining the split rollers 60 together, since the protrusion 74 and the depression 76 are allowed to engage with each other, the couple of the split rollers 60 are combined without being displaced from each other to permit the cylindrical roller to be formed.

Figure 6A:
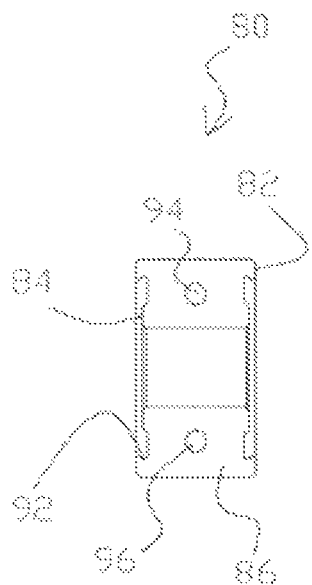
FIG. 6(*a*) is a front view showing a split roller making up a roller of a chain according to a fourth embodiment of the present invention.
Figure 6B:
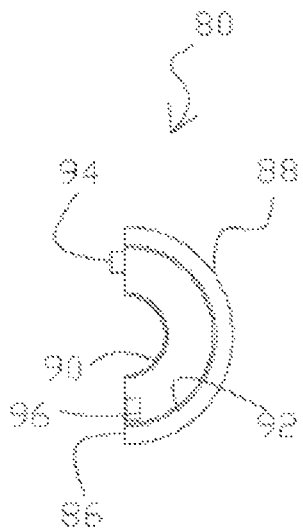

FIG. 6(a) and FIG. 6(b) are views showing a split roller 80 making up a roller of a chain according to the fourth embodiment of the present invention: FIG. 6(a) is a front view and FIG. 6(b) is a side view.

Also by combining a couple of such split rollers 80 with each other, it becomes possible to join and integrate the couple of the split rollers 80 together as is done in the third embodiment.

As above, the embodiments of the present invention are described. A technical scope of the present invention, however, does not limit the embodiments described above. Those skilled in the art obviously make various altered embodiments and various modifications even within the technical scope described in claims. Therefore, these altered embodiments and modifications are considered to obviously fall within the technological scope of the present invention.

In the embodiments, e.g., the chain provided with (made up of) the pin link plates (the outer link plates) and the bush link plates (the inner link plates) has been described. Not limiting to these chains, however, the present invention is applicable also to a type of a chain provided with rollers in an outer circumference of each of bushes.

Figure 7A:
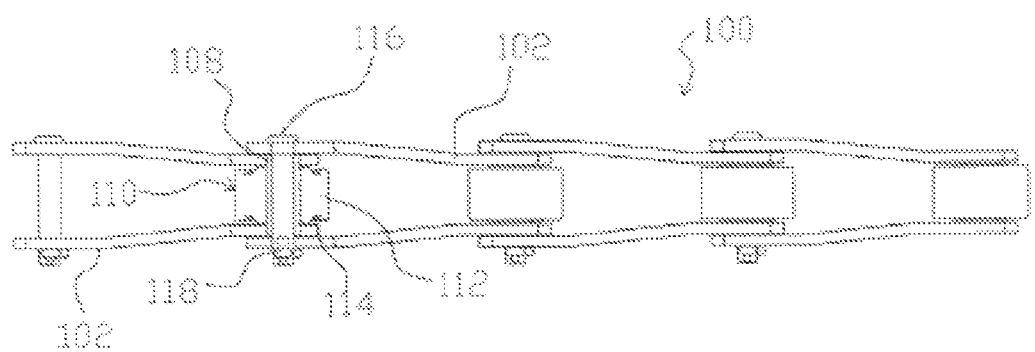
FIG. 7(*a*) is a plain view of a chain according to a fifth embodiment of the present invention.
Figure 7B:
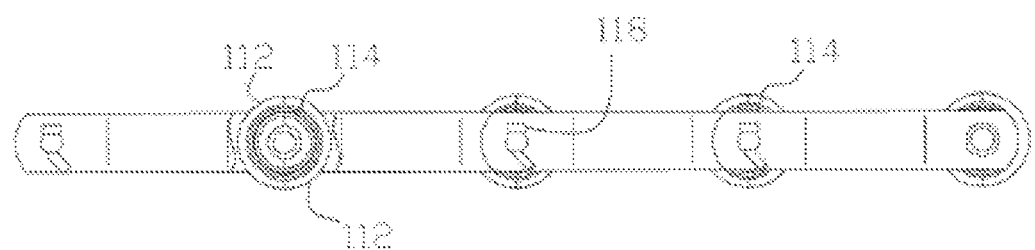
Figure 8:
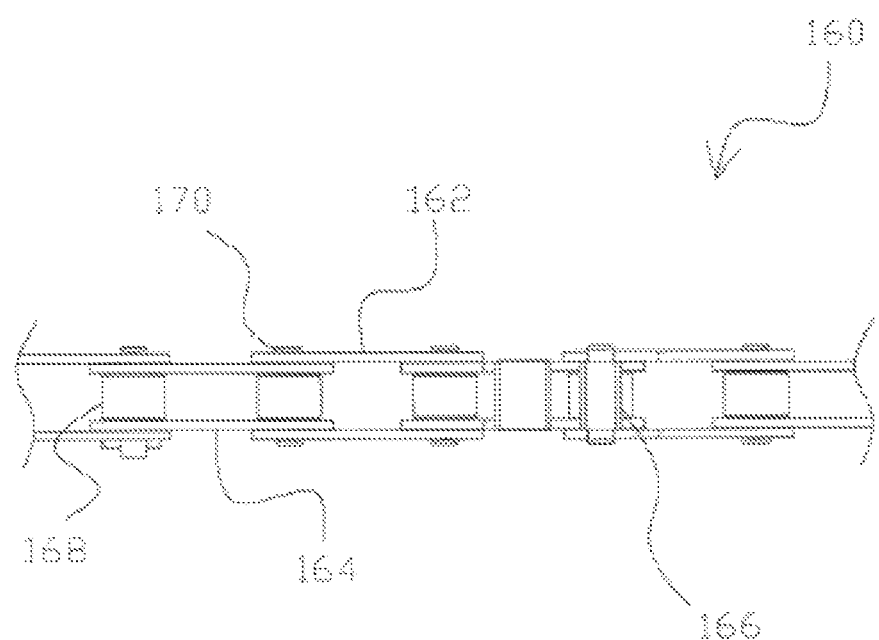
FIG. 8 is an overall view of a conventional chain.

Specifically, e.g., the present invention is applicable also to a chain of an offset type as shown in FIG. 7(a) and FIG. 7(b).

Further, in the embodiments, the examples where the grooves are provided on both the end faces of the split roller to engage with the stop rings have been described. The groove, however, may be provided on one end face to engage with the stop ring. Furthermore, in the embodiments, the examples where the roller is formed from the couple of the split rollers have been shown. Three or more split rollers, however, may be combined to form the roller.

EXPLANATION OF NUMERALS 2. chain
4. pin link plate (outer link plate)

6. bush link plate (inner link plate)
8. bush
10. roller
12. split roller
14. stop ring
16. cotter pin
18. T pin
20. split roller
22, 24 end face
26. combining surface
28. outer circumferential surface
30. inner circumferential surface
32. groove
34. protrusion
36. depression
38. stop ring
40. split roller
42, 44 end face
46. combining surface
48. outer circumferential surface
50. inner circumferential surface
52. groove
54. protrusion
56. depression
60. split roller
62, 64 end face
66. combining surface
68. outer circumferential surface
70. inner circumferential surface
72. groove
74. protrusion
76. depression
80. split roller
82, 84 end face
86. combining surface
88. outer circumferential surface
90. inner circumferential surface
92. groove
94. protrusion
96. depression
100. chain
102. offset link plate
108. bush
110. roller
112. split roller
114. stop ring
116. cotter pin
118. T pin
160. chain
162. pin link plate (outer link plate)
164. bush link plate (inner link plate)
166. bush
168. roller
170. pin

What is claimed is:

1. A chain comprising:
bush link plates provided with bush fitting holes;
bushes fitted into the bush fitting holes;
rollers fitted rotatably on an outer circumference of each of the bushes,
wherein the chain is formed from split rollers made by splitting the roller into two or more parts; and
a groove is provided on at least one of end faces of the split roller and the split rollers are joined together by engaging a stop ring with the groove.

2. A chain comprising:
bush link plates provided with bush fitting holes;
bushes fitted into the bush fitting holes,
rollers fitted rotatably on an outer circumference of each of the bushes,
wherein the chain is formed from split rollers made by splitting the roller into two or more parts;
a groove is provided on at least one of end faces of the split roller and the split rollers are joined together by engaging a stop ring with the groove; and
on each combining surface of each of the split rollers, there are provided a protrusion and a depression which are allowed to engage with each other when combining the split rollers with each other.

* * * * *